(12) United States Patent
Rembe et al.

(10) Patent No.: US 8,913,247 B2
(45) Date of Patent: Dec. 16, 2014

(54) DEVICE AND METHOD FOR INTERFEROMETRIC VIBRATION MEASUREMENT OF AN OBJECT

(75) Inventors: Christian Rembe, Waldbronn (DE); Alexander Dräbenstedt, Ettlingen (DE); Michael Gartner, Bühl (DE); Mike Herberich, Karlsbad (DE); Andreas Leonhardt, Bretten (DE)

(73) Assignee: Polytec GmbH, Waldbronn (DE)

( * ) Notice: Subject to any disclaimer, the term of this patent is extended or adjusted under 35 U.S.C. 154(b) by 468 days.

(21) Appl. No.: 12/907,117

(22) Filed: Oct. 19, 2010

(65) Prior Publication Data

US 2011/0090508 A1    Apr. 21, 2011

(30) Foreign Application Priority Data

Oct. 19, 2009    (DE) .......................... 10 2009 049 932

(51) Int. Cl.
*G01B 9/02*    (2006.01)
*G01C 3/08*    (2006.01)
*G01P 3/36*    (2006.01)
*G01H 9/00*    (2006.01)

(52) U.S. Cl.
CPC ........................................ *G01H 9/00* (2013.01)
USPC ............. 356/477; 356/4.09; 356/28; 356/450

(58) Field of Classification Search
CPC .......... G01H 9/00; G01H 9/004; G01H 9/006
USPC ............... 356/450, 4.09, 4.1, 28.5, 35.5, 618, 356/477, 432, 497, 482; 73/655
See application file for complete search history.

(56) References Cited

U.S. PATENT DOCUMENTS

| 5,305,084 A | 4/1994 | Doi et al. |
| 6,134,006 A | 10/2000 | Telschow et al. |

(Continued)

FOREIGN PATENT DOCUMENTS

| DE | 102006003877 | 10/2007 |
| EP | 1148321 | 10/2001 |

(Continued)

OTHER PUBLICATIONS

Zhu, et al. "Integration of Laser Vibrometry with Infrared Video for Multimedia Surveillance Display" The City College of New York, New York, Dec. 2004.*

(Continued)

*Primary Examiner* — Kara E Geisel
*Assistant Examiner* — Dominic J Bologna
(74) *Attorney, Agent, or Firm* — Volpe and Koenig, P.C.

(57) ABSTRACT

A device for interferometric vibration measurement, having a radiation source for generating an original beam, a first beam splitter for dividing it into measuring and reference beams, a detector and a focusing device. The measuring beam at least partly reflected by the object and the reference beam are superimposed on a detection area of the detector, and the focusing device in the beam path of the measuring beam between the image unit and object focuses it onto a measuring point. Here, a measuring beam having a wavelength greater than 1100 nm is generated and the device has an image unit for two-dimensional imaging of the object surrounding the measuring point. The measuring beam focus lies in the focal plane of the image unit and, by use of the focusing device, the focal point of the measuring beam and the focal plane of the imaging unit are displaceable simultaneously.

12 Claims, 1 Drawing Sheet

(56) References Cited

U.S. PATENT DOCUMENTS

| | | |
|---|---|---|
| 6,545,762 B2 | 4/2003 | Lewis et al. |
| 2005/0280830 A1* | 12/2005 | Rembe .................. 356/511 |
| 2006/0262319 A1* | 11/2006 | Gatt ..................... 356/492 |
| 2007/0239035 A1 | 10/2007 | Nakabayashi |
| 2008/0285049 A1 | 11/2008 | Rembe et al. |
| 2009/0046296 A1 | 2/2009 | Kilpatrick et al. |
| 2009/0153839 A1* | 6/2009 | Kay ...................... 356/51 |
| 2009/0251706 A1 | 10/2009 | Rembe et al. |

FOREIGN PATENT DOCUMENTS

| | | |
|---|---|---|
| WO | 2006124939 | 11/2006 |
| WO | 2009044387 | 4/2009 |

OTHER PUBLICATIONS

Li, W.H. et al., Remote Voice Acquisition in Multimodal Surveillance, In: ICME 2006, pp. 1649-1652.

Ngoi, B.K.A. and Benkatakrishnan, K, Scanning Laser Vibrometer for Dynamic Study of Small Features. In: Opt. Eng., 39, Nov. 2000, pp. 2995-3000.

Li, W.H. et al.: Remove Voice Acquisition in Multimodal Surveillance. In: INCE 2006, pp. 1649-1652.

Ngoi, B.K.A & Venkatakrishnan, K: Scanning Laser Vibrometer for Dynamic Study of Small Features. In: Opt. Eng., Nov. 2000, vol. 39 (11), pp. 2995-3000.

\* cited by examiner

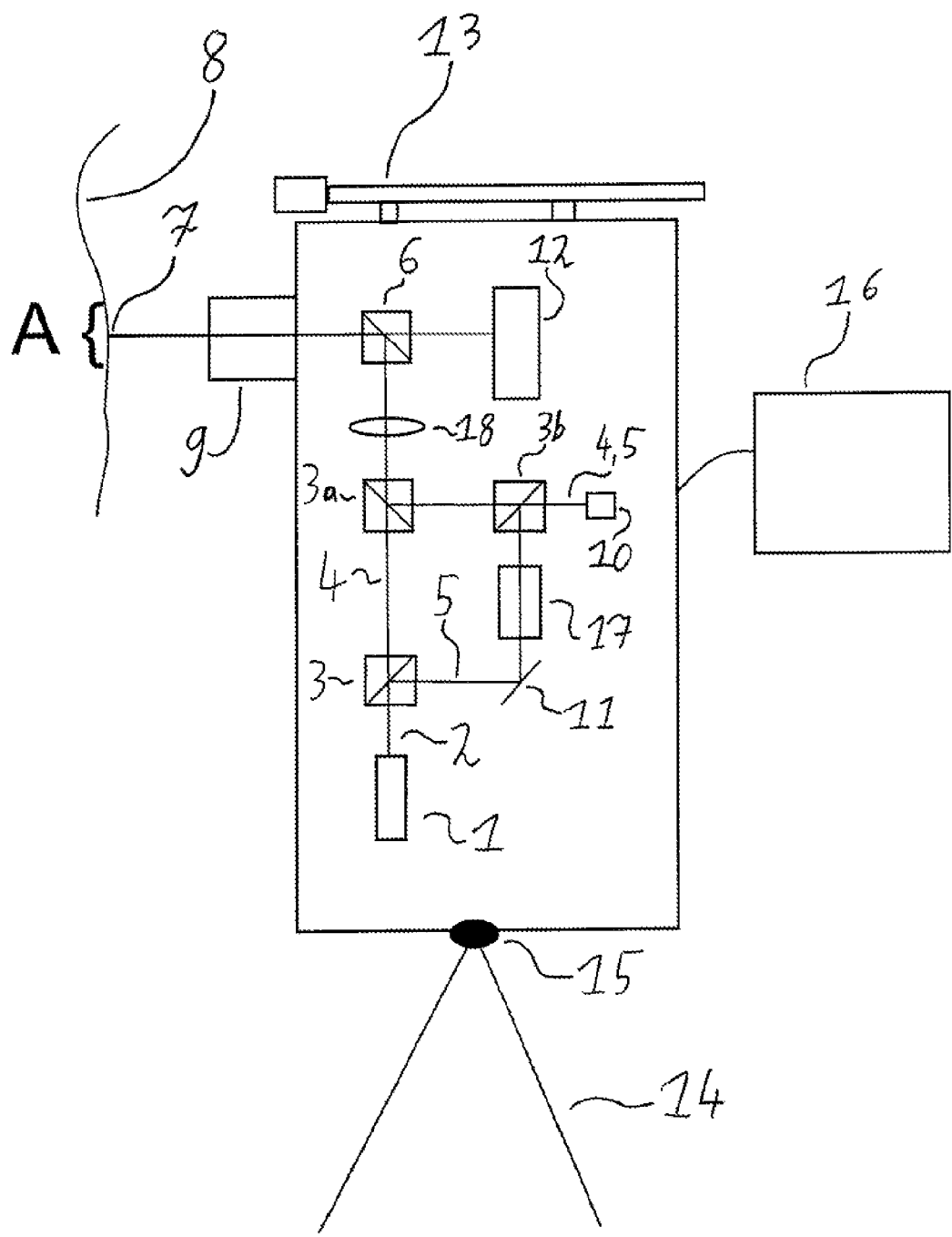

DEVICE AND METHOD FOR INTERFEROMETRIC VIBRATION MEASUREMENT OF AN OBJECT

CROSS-REFERENCE TO RELATED APPLICATIONS

This application claims the benefit of German Patent Application No. 10 2009 049 932.6, filed Oct. 19, 2009, which is incorporated herein by reference as if fully set forth.

BACKGROUND

The invention relates to a device for interferometric vibration measurement on an object and to a method for such measurement.

It is known to measure vibrations on an object contactlessly using an interferometer, for example a laser Doppler interferometer. A typical interferometer of that kind comprises a radiation source, a beam splitter and a detector.

In such an arrangement, an original beam generated by the radiation source is divided by the beam splitter into a measuring beam and a reference beam. The measuring beam is guided onto a measuring point on the object and the measuring beam at least partly reflected by the object is superimposed with the reference beam on a detection area of the detector, so that using the detector, a superimposition or interference signal between measuring and reference beams can be measured.

The frequency of the measuring beam is affected by the movement or vibration of the object surface, so that on the basis of the superimposition signal of the measuring and reference beams, conclusions can be drawn as to the movement of the object, especially the vibration frequency of the object surface.

In such an arrangement, the radiation source must generate monochromatic radiation or at least radiation having a sufficiently large coherence length. Lasers are typically used as radiation sources.

Furthermore, it is known to arrange in the beam path of the measuring beam a focusing device by which the measuring beam is focussed onto the measuring point on the object.

In interferometric vibration measurement it is customary to use a laser-generated measuring beam having a wavelength in the visible range, that is to say in a wavelength range of from 380 nm to 750 nm, which in principle involves risk of injury, especially to the human eye. Increased safety precautions are therefore necessary, or a low-power laser must be used, for example a class 1 laser having an output of less than 25 µW. This is disadvantageous in terms of limitation of the range of application, the costs arising as a result of the safety precautions and/or deterioration in the quality of the measurement signals (especially the signal-to-noise ratio) on account of the low laser power and accordingly the low intensity of the measuring beam.

SUMMARY

The invention is based on the objective of improving the previously known device and the previously known method for interferometric vibration measurement on an object in respect of handling by the user, and especially of broadening the range of application without the need for increased safety precautions. Furthermore, the alignment and/or focusing of the measuring beam should be simplified.

This objective is met by a device and a method according to the invention. Advantageous forms of the device and the method are described in detail below and in the claims.

The device according to the invention for interferometric vibration measurement on an object comprises a radiation source for generating an original beam, a first beam splitter for dividing the original beam into a measuring beam and a reference beam, a detector and a focusing device.

The device is implemented in such a way that, as in the case of previously known interferometers, the measuring beam is guidable onto a measuring point on the object and the measuring beam at least partly reflected by the object and the reference beam are superimposed on a detection area of the detector. On the basis of the measurement signals of the detector it is accordingly possible to determine the vibration frequency of the surface of the object at the measuring point.

The focusing device is arranged in the beam path of the measuring beam and is implemented in such a way that the measuring beam can be focussed onto the measuring point on the object.

It is important that, using the device, a measuring beam having a wavelength greater than 1100 nm can be generated and that the device additionally comprises an image unit for the two-dimensional imaging of at least a sub-region of the object surrounding the measuring point and, furthermore, the focusing device is arranged in the beam path between image unit and object. The focusing device is constructed in such a way that the focus of the measuring beam lies approximately in the focal plane of the image unit and, by use of the focusing device, the focal point of the measuring beam and the focal plane of the imaging unit are displaceable simultaneously.

An important difference in comparison with the previously known devices is accordingly that the measuring beam has a wavelength greater than 1100 nm, that is to say, especially, the measuring beam is not visible to the human eye. This gives rise to the advantages that measurements on an object are not perceived by the human eye and that high measuring beam intensities are possible with fewer safety precautions in comparison with the use of measuring beams in the visible range.

By the use of a measuring beam that is not visible to the human eye, however, the setting of the desired measuring conditions, especially the alignment of the measuring beam with a desired measuring point on the object, is made more difficult, because the user cannot directly check the alignment of the measuring beam by visual monitoring.

In the case of the device according to the invention, therefore, both the beam path of the measuring beam and the beam path between image unit and object pass by way of the focusing device, that is to say both beam paths pass at least partly through the same optical components belonging to the focusing device.

In the case of the device according to the invention it is accordingly ensured that the focus of the measuring beam lies approximately in the focal plane of the image unit and accordingly a displacement of the focal plane of the image unit by the focusing device simultaneously results in a corresponding displacement of the focal point of the measuring beam.

The method according to the invention for interferometric vibration measurement on an object using the device according to the invention comprises the following steps:

Using the radiation source, an original beam is generated which is divided by a first beam splitter into a reference beam and a measuring beam. The reference beam is superimposed with the measuring beam at least partly reflected by the object on the detection area of the detector. Furthermore, the measuring beam is focussed by the focusing device onto the measuring point on the object. The measuring beam has a wavelength greater than 1100 nm.

Furthermore, by use of the image unit, a sub-region of the object surrounding the measuring point is imaged two-dimensionally, the image unit likewise being focussed onto the sub-region by the focusing device.

Because the focus of the measuring beam always lies approximately in the focal plane of the image unit, the focusing of the image unit onto the sub-region by the focusing device simultaneously effects at least approximate focusing of the measuring beam onto the measuring point.

The device according to the invention and the method according to the invention accordingly have the advantage that the alignment and the focusing of the measuring beam, which is not visible to the human eye, is made considerably simpler for a user:

By visually monitoring the sub-region of the object surrounding the measuring point imaged using the image unit, the user is able to align the measuring beam in a simple way, because he can directly check the sub-region surrounding the measuring point. "Bringing into focus", as known for photographic cameras or video cameras, is equally possible in a simple way: by visually monitoring the imaged sub-region the user effects focusing of the image unit onto the sub-region and, as a result, focusing of the measuring beam onto the measuring point is achieved simultaneously.

The alignment and focusing of the measuring beam is accordingly possible without its being necessary to know, for example, the distance between the device according to the invention and the object being measured. Likewise, the execution of the measurement on the object is not visible to the human eye, because neither the non-visible measuring beam nor the imaging of the sub-region are discernible to the human eye on the object being measured.

The device according to the invention and the method according to the invention also have the advantage that the image unit need not be sensitive in respect of the measuring beam. This is because, by virtue of the correlation between the imaged sub-region and the measuring point in respect of alignment and focusing, it is not necessary for the measuring beam or the measuring point per se to be made visible to the user by the image unit. More especially, conventional image units for imaging in the visible range can be used and it is not necessary to use cost-intensive image units that are also sensitive in a wavelength range greater than 1100 nm, such as, for example, InGaAs sensors.

Preferably, the radiation source is constructed in such a way that an original beam having a wavelength greater than 1100 nm can be generated, that is to say by use of the radiation source an original beam having a wavelength greater than 1100 nm is generated. As a result, it is ensured in a simple way that the measuring beam also has a wavelength greater than 1100 nm.

Preferably, the device according to the invention is implemented in such a way that the focus of the measuring beam always lies exactly in the focal plane of the image unit or, by the method according to the invention, the measuring beam is simultaneously focused exactly onto the measuring point. As a result of the technical circumstances (manufacturing tolerances etc.) of the optical components used, however, very slight deviations may arise.

The image unit is preferably implemented in such a way that the sub-region can be imaged two-dimensionally in the visible range (wavelength range 380 nm to 750 nm) or at least a sub-range thereof or, by the method according to the invention, the image region is imaged two-dimensionally in the visible range or at least a sub-range thereof. As a result, visual monitoring by the user is possible in a simple way.

Advantageously, the device according to the invention comprises a second beam splitter which is arranged in the beam path of the measuring beam between focusing device and detector and in the beam path of the image unit between focusing device and image unit. The beam splitter is arranged and constructed in such a way that for radiation in the visible range in the beam path between focusing device and image device there is a loss of intensity of less than 50% and in the case of the measuring beam in the beam path between focusing device and detection area of the detector there is a loss of intensity of likewise less than 50%. In this advantageous form, division of the beam accordingly takes place in such a way that, using the second beam splitter, at least in the visible range the radiation coming from the focusing device is guided onto the image unit with a radiation intensity of more than 50% and the measuring beam reflected by the object, coming from the focusing device, is guided onto the detection area of the detector with a radiation intensity likewise of more than 50%.

Accordingly, division of the radiation inside the device according to the invention, coming from the focusing device, is effected in such a way that the measuring beam is guided at least predominantly onto the detector and the visible radiation is guided at least predominantly onto the image unit. As a result, especially on the detection area of the detector but equally in the case of the image unit, a high intensity is achieved in respect of the relevant radiation, so that better measurement results (especially a better signal-to-noise ratio) and better image quality are achieved. More especially, it is advantageous that the said loss of intensity, both in the case of the radiation in the visible range and in respect of the measuring beam, is less than 30%, that is to say that by means of the second beam splitter the beams at least in the visible range are guided onto the image unit to an extent of more than 70% in respect of the radiation intensity and the measuring beam reflected by the object is guided onto the detector to an extent of more than 70% in respect of the radiation intensity.

Preferably, the second beam splitter is in the form of a dichroic beam splitter. More especially, one construction is advantageous in that, in the visible range, in respect of the radiation intensity at least 50% of the radiation pass through the second beam splitter and the second beam splitter reflects at least 50% in respect of the radiation intensity for the measuring beam. More especially, transmissibility in the case of radiation in the visible range of at least 70% in respect of the radiation intensity and reflection in the case of the measuring beam of at least 70% in respect of the radiation intensity is advantageous.

Because the second beam splitter is implemented in the form of a dichroic beam splitter, the desired separation of the radiation in respect of radiation in the visible range on the one hand and the measuring beam on the other hand can be realised in a simple way.

Advantageously, the image unit is constructed in such a way that on the sub-region of the object imaged by the image unit it is possible to display a target symbol, preferably a target cross, at the location of the measuring point. In the case of the method according to the invention, using the image unit a target element, especially a target cross, is advantageously displayed on the image of the sub-region of the object at the location of the measuring point.

As a result, the location of the measuring point is displayed to the user in a simple way on the image of the sub-region of the object and accordingly exact positioning of the measuring point on the object being measured is made possible in a simple way.

The display of the target symbol can be achieved by arranging optical components for imaging a target cross on the image unit in the beam path between object and image unit. In a preferred embodiment, however, the target symbol is produced by suitably supplementing and/or modifying the image signals of the image unit, the target symbol being shown when the image signals are displayed, for example on a monitor. In this advantageous embodiment, a virtual target symbol is accordingly produced by altering/supplementing the image signals.

More especially, it is advantageous for target symbols to have a high contrast in brightness with respect to the image region surrounding the target symbol. Advantageously, a mean value of the brightness values of the pixels surrounding the target symbol is ascertained and the target symbol is displayed in a light colour, especially white, when the mean value lies below a preset threshold value and the target symbol is displayed in a dark colour, especially black, when the mean value lies above a preset threshold value.

Preferably, the device according to the invention has an evaluating unit connected to the detector for amplifying and/or modifying the measurement signals of the detector and the evaluating unit is constructed in such a way that the vibrations of the object measured at the measuring point by means of the detector in the audible frequency range or sub-ranges thereof can be output acoustically.

The acoustic output is preferably effected in such a way that the device outputs the vibrations in the audible frequency range in the form of electrical vibrations, so that an acoustic output can be effected by customary loudspeakers or headphones.

In this preferred embodiment, acoustic reproduction of the vibrations present at the location of the measuring point on the object is accordingly possible in a simple way. As a result, for example, sound waves at the location or in the region of the object being measured, which cause the object to vibrate accordingly, are audible to a user by way of the acoustic output of the device according to the invention.

Preferably, the evaluating unit has a level indicator for reproducing the intensity of the measurement signal of the detector, especially for reproducing a level correlating with the vibration amplitude of the object at the location of the measuring point. As a result, the user additionally receives visual monitoring information relating to the vibration of the object at the location of the measuring point, especially relating to the intensity of the vibration. This allows the user to carry out fine adjustment of the focusing in such a way that the intensity of the measurement signal, that is to say of the signal level shown by the level indicator, is maximised by fine adjustment of the focusing.

Preferably, the evaluating unit comprises a multi-frequency filter (equalizer) for the selectively presettable reduction of a plurality of frequency ranges. Such multi-frequency filters are known per se and are used, for example, in music reproduction apparatus for damping different frequency ranges by respective selectively presettable factors, that is to say to reduce the intensity of the signal in the respective frequency range by a selectively presettable factor.

In that advantageous embodiment of the device according to the invention it is accordingly possible to suppress interfering effects by suppressing, entirely or to a higher degree than the other frequency ranges, the frequency ranges in which the interfering effects principally arise. More especially, it is advantageous that the multi-frequency filter comprises a memory unit and in the memory unit a plurality of filter parameter sets are stored, the filter parameter sets containing a corresponding reduction factor for each frequency range. The multi-frequency filter is implemented in such a way that the filter parameter sets are selectable as desired by a user and modification of the signal output by the evaluating unit is effected in accordance with the selected filter parameter set.

As a result, it is possible to provide in the memory unit, for example, filter parameter sets optimised for different object materials, so that the user obtains optimum reproduction of sound waves dominant at the location of the object independently of material properties of the object, by selection of the filter parameter set associated with the material in question.

As described above, the image unit serves for imaging at least a sub-region of the object being measured, the measuring point lying inside the sub-region. In principle, it is possible for the image unit to be constructed like an optical telescope. Advantageously, however, the image unit is in the form of a photographic camera and/or video camera, especially in the form of a digital camera.

The image unit therefore preferably comprises a digital two-dimensional recording sensor, especially an optical CCD sensor known for digital cameras or an optical sensor based on CMOS technology. The device is so constructed that the sub-region of the object is imaged onto the digital image sensor by way of the focusing device and optionally further optical components.

The image unit is preferably constructed for recording and/or displaying a direct image of the object, especially a non-interferometric display. Preferably, the camera is constructed for photographically recording and/or displaying the object in a manner known per se for photographic cameras or video cameras.

Furthermore, the imaging unit preferably has a display unit for displaying the sub-region recorded by the digital image sensor and/or a connector for connection of an image display device, such as a monitor and/or visual display goggles.

As a result, visual display of the sub-region of the object is possible in a simple and cost-effective way especially using commercially available components, such as, for example, LCD monitors or LCD visual display goggles.

Advantageously, the image signals of the image unit are processed by the previously described evaluating unit in such a way that they can be displayed on customary display apparatus such as monitors and/or visual display goggles. More especially, using the evaluating unit a virtual target symbol is preferably added, as described above As described above, the device according to the invention is constructed in such a way that the measuring point lies inside the sub-region and a displacement of the sub-region results in a corresponding displacement of the measuring point, so that the relative position of the measuring point inside the sub-region is unchanged. Preferably, the measuring point lies approximately centrally inside the sub-region of the object imaged onto the image unit.

Alignment of sub-region and measuring point can be carried out by the user moving, that is to say turning and/or tilting, the entire device according to the invention. It equally lies within the scope of the invention for the device to have optical deflecting mechanisms such as, for example, rotating mirrors, which are arranged both in the beam path between object and image unit and in the beam path of the measuring beam, so that the sub-region and the measuring point on the object are displaceable simultaneously, without the position of the measuring point relative to the sub-region being altered. Preferably, the displacement takes place selectively in two spatial directions perpendicular to one another.

An especially robust and simple advantageous form of the device according to the invention is obtained when the entire device is arranged in a common housing and the alignment is effected by suitable rotation and/or tilting of the housing and no deflecting mechanisms are provided. For example, the device according to the invention can be arranged like a video camera on a tripod with a pan/tilt head, so that, as known for video cameras, alignment of sub-region and measuring point on the object is effected by rotating and/or pivoting the device.

In a further preferred embodiment, the device according to the invention additionally comprises an optical telescope which is connected to the device and arranged in such a way that the field of view of the telescope includes the measuring point, especially that the measuring point lies approximately centrally in the field of view of the telescope. Furthermore, the telescope is preferably constructed in such a way that the field of view of the telescope is substantially larger than the sub-region of the object imaged onto the image unit.

For alignment of the sub-region and the measuring beam, in this advantageous embodiment it is accordingly possible first for a coarse alignment to be carried out by the telescope, because the field of view of the telescope covers a substantially larger region that the sub-region of the object imaged onto the image unit. In this connection it is especially advantageous when the telescope also comprises a target element, such as, for example, a target cross, which marks the location of the measuring point. Accordingly, for coarse alignment the user looks through the telescope and aligns the device according to the invention in such a way that the desired measuring point lies centrally in the field of view of the telescope or the target symbol is aligned with the desired measuring point. Then the user carries out fine alignment by viewing the image of the sub-region of the object imaged onto the image unit (for example by way of an image display or visual display goggles) and, as necessary, readjusts the device in respect of the alignment. The fine adjustment can be carried out especially precisely when, also by the image unit, a target symbol is displayed for the user at the location of the measuring point.

The focusing is preferably effected as follows: in a process step F1, focusing onto at least the sub-region of the measurement object is effected, the image of the sub-region on the image unit again being reproduced by a display unit (such as, for example, an image display or visual display goggles) during the focusing, so that the focusing can be carried out by the user by visual monitoring. By virtue of the coupling of the focusing of the image unit and of the measuring beam, focusing of the measuring beam onto the measuring point is effected, at least approximately, at the same time.

In a subsequent process step F2 (optionally with the interposition of further process steps), in this preferred embodiment of the method according to the invention fine adjustment of the focusing of the measuring beam onto the measuring point is carried out by optically and/or acoustically outputting the signal level of the measurement signal of the detector and/or by outputting the vibration of the measuring point measured by the detector in the audible frequency range. The fine adjustment is accordingly effected by the user's maximising the signal level and/or carrying out the fine adjustment on the basis of the acoustic output.

The above-described alignment is preferably effected as process step F0 (optionally with the interposition of further process steps) prior to process steps F1 and F2.

It equally lies within the scope of the invention to carry out alignment and focusing at the same time and in a plurality of sub-steps alternately one after the other.

The radiation source is preferably such that it generates monochromatic radiation. More especially, the radiation source is advantageously implemented in the form of a laser, preferably in the form of a narrow-band laser having a line width of less than 2 kHz; also preferably in the form of an erbium fibre laser.

The small line width of less than 2 kHz and preferably less than 500 Hz, reduces the noise in the measurement signal.

The detector is preferably in the form of an InGaAs detector.

The focusing device preferably has at least one displaceable lens and more especially a lens system having at least one displaceable lens, so that by displacement of one or more lenses a corresponding simultaneous displacement both of the focal plane of the image unit and of the focal point of the measuring beam takes place.

Preferably, the radiation source is in the form of a laser which generates an original beam having a wavelength greater than 1100 nm.

Preferably, the radiation source generates an original beam in a wavelength range greater than 1500 nm, especially in a wavelength range between 1500 nm and 1800 nm. This is because in that wavelength range a laser class 1 classification is achieved if the output of the measuring beam does not exceed 10 mW. As a result, on the one hand a high-quality measurement signal (especially a good signal-to-noise ratio) is possible and on the other hand, in accordance with the laser class 1 classification, only a low level of safety precautions have to be taken during the manufacture and use of the device according to the invention or the method according to the invention, compared with higher laser classes. The device is therefore preferably constructed in such a way that the output of the measuring beam is less than 10 mW and greater than 5 mW, preferably greater than 8 mW.

More especially, the radiation source is preferably in the form of a laser which generates a measuring beam having a wavelength of about 1550 nm.

The size of the measuring point and of the sub-region imaged by the image unit depends substantially upon the form of the optical components of the device, especially upon the form of the focusing device and, furthermore, upon the distance between object and focusing device. The greater the distance, the larger are the sub-region and measuring point (in each case in the focussed state) on the object. Preferably, the device is so constructed that measurements can be performed at least in a distance range between object and focusing device of from 20 m to 50 m, preferably from 5 m to 100 m.

The device is preferably so constructed that the measuring point on the object covers a surface area of less than 300 $mm^2$, especially a surface area of less than 100 $mm^2$, preferably less than 50 $mm^2$, in order to achieve a high degree of measuring accuracy. More especially, the device is advantageously constructed in such a way that the measuring point on the object, at an object-to-focusing device distance of about 5 m, covers a surface area of less than 0.2 $mm^2$, preferably in the range of from 0.05 $mm^2$ to 0.2 $mm^2$, especially about 0.1 $mm^2$, and/or, at an object-to-focusing device distance of about 100 m, covers a surface area of less than 100 $mm^2$, preferably in the range of from 70 $mm^2$ to 30 $mm^2$, especially about 50 $mm^2$.

The device is preferably constructed in such a way in respect of the sub-region imaged by the image unit that the sub-region of the object that is imaged is larger than the measuring point, and especially has a surface area greater than 50 $cm^2$, preferably greater than 100 $cm^2$, in order to allow easy alignment and focusing. More especially, the device is advantageously constructed in such a way that the sub-region on the object, at an object-to-focusing device distance of about 5 m, covers a surface area greater than 100 cm$^2$, preferably in the range of from 100 cm$^2$ to 500 cm$^2$, especially about 150 cm$^2$, and/or, at an object-to-focusing device distance of about 100 m, covers a surface area greater than 1 m$^2$, preferably in the range of from 1 m$^2$ to 10 m$^2$, especially about 5 m$^2$.

The measuring point is preferably round, square or rectangular (especially rectangular with a base to height ratio of more than 1 and less than 10, preferably less than 5, especially less than 2). The same applies to the imaged sub-region.

BRIEF DESCRIPTION OF THE DRAWING

Further features and preferred forms of the device according to the invention and of the method according to the invention are described below with reference to the exemplary embodiment of a device according to the invention shown diagrammatically in FIG. 1.

DETAILED DESCRIPTION OF THE PREFERRED EMBODIMENT

The exemplary embodiment shown in FIG. 1 comprises a radiation source 1 in the form of a laser which generates a monochromatic original beam 2 having a wavelength of 1550 nm and a line width of less than 500 Hz. Through the use of a first beam splitter 3, the original beam 2 is split into a measuring beam 4 and a reference beam 5.

The measuring beam 4 is guided by way of a second beam splitter 6 onto a measuring point 7 on an object 8 to be measured. A focusing device 9 is arranged in the beam path of the measuring beam 4 between object 8 and second beam splitter 6, for focusing the measuring beam 4 onto the measuring point 7.

The focusing device 9 has an optical lens (not shown) displaceable parallel to the measuring beam 4.

The measuring beam 4 at least partly reflected by the object 8 is guided by way of the focusing device 9 and the second beam splitter 6 onto a detection area of the detector 10 and is superimposed with the reference beam 5 thereon. The superimposition of measuring and reference beams is effected in a manner known per se by further optical components: a mirror 11 and two further beam splitters 3a and 3b.

It is important that the device according to the invention also comprises an image unit 12 in the form of a digital CCD or CMOS camera. The image unit 12 is constructed to co-operate with the focusing device 9 and the second beam splitter 6 in such a way that a sub-region A is focussed two-dimensionally onto a CCD chip of the image unit 12. For ease of viewing, in FIG. 1 only a central beam path between sub-region A and image unit 12 is shown.

The focusing device 9 accordingly serves both for focusing the measuring beam 4 and for focusing the sub-region A imaged onto the image unit 12. The device according to the invention is implemented in such a way that the measuring point 7 lies centrally in the sub-region A and that the focal point of the measuring beam lies approximately in the focal plane of the image unit 12.

The device according to FIG. 1 also comprises a telescope 13 which is connected to the device and aligned in such a way that the measuring point 7 and the sub-region A lie centrally in the field of view of the telescope 13. FIG. 1, for the sake of better clarity, is not true to scale; in particular, the distance between the device and the object 8 is shown greatly reduced in comparison with the dimensions of the device according to the invention. The telescope 13 has a target cross arranged centrally in the field of view of the telescope, marking the location of the measuring point 7.

The device according to FIG. 1 is mounted on a tripod 14 by means of a geared tilt head 15.

The device also comprises an evaluating unit 16 which is connected both to the detector 10 and to the image unit 12.

To perform an interferometric vibration measurement on the measuring point 7 of the object 8, first of all coarse alignment of the device is carried out, for which the user looks through the telescope 13 and, using the geared tilt head 15, carries out rotating and/or pivoting movements so that the target cross in the field of view of the telescope 13 lies approximately on the desired measuring point 7 on the object 8.

The evaluating unit 16 has a connector for connection of visual display goggles and outputs corresponding image signals of the CCD chip of the image unit 12 at that connector. Furthermore, the evaluating unit 16 is constructed in such a way that, in addition to the image signals of the image unit 12, a target cross marking the location of the measuring point 7 is output.

After coarse alignment of the device, the user puts on a pair of visual display goggles connected to the previously mentioned connector of the evaluating unit 16 and thus in a simple way, through visual monitoring, can carry out fine alignment for the exact positioning of the measuring point 7 on the desired location point on the object 8.

The differentiation into coarse and fine alignment results from the fact that the field of view of the telescope 13 is substantially larger than the sub-region A displayed by the image unit 12. In the same way, the depth of field of the telescope 13 that is achievable is considerably greater than that of the image unit 12 when displaying the sub-region A.

The fine alignment is likewise carried out by rotating and/or pivoting movements by means of the geared tilt head 15.

Once the alignment is complete, the focusing is carried out.

In that procedure, first of all coarse focusing is carried out: the user selects, by use of the focusing device 9, the focal plane of the image unit 12 in such a way that it lies on the surface of the object 8 in the sub-region A, that is to say the user brings the sub-region A into focus.

Then the fine adjustment of the focusing is carried out. For that purpose, the user puts on a pair of headphones connected to the evaluating unit 16.

The evaluating unit 16 is constructed in such a way that on the basis of the measurement signals of the detector 10 it determines the vibrations of the measuring point 7 on the object 8 in the audible frequency range and outputs corresponding electrical signals to a headphones output to which the afore-mentioned headphones are connected.

Sound waves in the environment of the object 8 have the result that the object 8 is caused to vibrate correspondingly, so that those sound waves are audible to the user via the headphones.

The user can thus simply carry out fine adjustment by acoustic monitoring in such a way that optimisation of the acoustically reproduced sound waves is effected, especially a maximisation of the sound level.

In order to increase the measuring accuracy, the interferometric structure of the device shown in FIG. 1 is in the form of a heterodyne interferometer and has a Bragg cell 17 with which a difference in frequency is generated by a modulation frequency between measuring beam 4 and reference beam 5.

The evaluation of the measurement signals of the detector 10 by the evaluating unit 16 is effected in the manner known for heterodyne interferometers.

The device according to FIG. 1 has, furthermore, an optical lens 18 which is in the form of a negative lens. Through use of the lens 18 a virtual focus is produced in respect of the measuring beam 4 and is imaged by the focusing device 9 onto the measuring point 7 of the object 8.

The invention claimed is:

1. A device for interferometric vibration measurement on an object, comprising:
   a radiation source for generating an original beam, a first beam splitter for dividing the original beam into a measuring beam and a reference beam, a detector and a focusing device,
   the device is implemented in such a way that the measuring beam at least partly reflected by the object and the reference beam are superimposed on a detection area of a detector,
   the focusing device is arranged in the beam path of the measuring beam, for focusing the measuring beam onto a measuring point on the object,
   the device is adapted to generate a measuring beam having a wavelength greater than 1100 nm,
   an image unit that provides a two-dimensional non-interferometric imaging of at least a sub-region of the object surrounding the measuring point,
   the focusing device is arranged in the beam path between image unit and the object, a focus of the measuring beam lies approximately in a focal plane of the image unit, and the focal point of the measuring beam and the focal plane of the image unit are displaceable simultaneously by the focusing device,
   a second beam splitter arranged in the beam path of the measuring beam between the focusing device and the detector and in the beam path of the image unit between the focusing device and the image unit that is constructed such that a loss of intensity of radiation in the visible range between focusing device and the image device is less than 50% so that the second beam splitter is transparent for light in the visible range in the beam path between the focusing device and the detector, and a loss of intensity of the measuring beam between the focusing device and the detection area of the detector is less than 50%, and
   an optical lens arranged in the beam path of the measuring beam to produce a virtual focus in respect of the measuring beam, said focus being imaged by the focusing device onto the measuring point of the object.

2. The device according to claim 1, wherein the second beam splitter is a dichroic beam splitter, that in the case of radiation in a visible range transmits at least 50% in respect of the radiation intensity and in the case of the measuring beam reflects at least 50% of the radiation intensity.

3. The device according to claim 1, wherein at least one of the image unit or an evaluating unit arranged to co-operate with the image unit is constructed in such a way that on a sub-region of the object imaged by the image unit, a target symbol is displayed at a location of the measuring point.

4. The device according to claim 1, further comprising an evaluating unit connected to the detector for at least one of amplifying or modifying the measurement signals of the detector, and the evaluating unit is constructed such that the vibrations of the object are measured at the measuring point with the detector in an audible frequency range or sub-ranges thereof that can be output acoustically.

5. The device according to claim 4, wherein the evaluating unit has a level indicator for reproducing an intensity of the measurement signal of the detector, for reproducing a level correlating with a vibration amplitude of the object.

6. The device according to claim 5, wherein the evaluating unit comprises a multi-frequency filter for a selective presettable reduction of a plurality of frequency ranges, and the multi-frequency filter comprises a memory unit having a plurality of stored filter parameter sets selectable by a user.

7. The device according to claim 1, wherein the image unit comprises a digital camera that is connectible to a monitor or visual display goggles to display a sub-region of the object.

8. The device according to claim 1, further comprising a telescope which is connected to the device and arranged in such a way that a field of view of the telescope includes the measuring point.

9. A method for interferometric vibration measurement on an object, comprising the following steps:
   generating an original beam from a radiation source,
   dividing the original beam into a reference beam and a measuring beam using a first beam splitter,
   superimposing the reference beam and the measuring beam at least partly reflected by the object on a detection area of a detector,
   focusing the measuring beam using a focusing device onto a measuring point on the object,
   the measuring beam is generated with a wavelength greater than 1100 nm,
   at least a sub-region (A) of the object surrounding the measuring point is imaged non-interferometric and two-dimensionally by an image unit, the image unit being focused by the focusing device onto the sub-region (A) of the object, and the focusing device is constructed such that a focus of the measuring beam always lies approximately in a focal plane of the image unit,
   the image unit is focused onto at least the sub-region (A) of the object and the measuring beam is simultaneously focused, at least approximately, onto the measuring point using the focusing device, and
   a second beam splitter is arranged in the beam path of the measuring beam between the focusing device and the detector and in the beam path of the image unit between the focusing device and the image unit to divide the beam such that, beams at least in a visible range are guided onto the image unit to an extent of more than 50% of radiation with respect to a radiation intensity so that the second beam splitter is transparent for light in the visible range in the beam path between the focusing device and the detector, and the measuring beam reflected by the object is guided onto the detector to an extent of more than 50% with respect to the radiation intensity, and
   with a lens arranged in the beam path of the measuring beam a virtual focus is produced in respect of the measuring beam and said focus is imaged by the focusing device onto the measuring point of the object.

10. The method according to claim 9, further comprising displaying a target element using at least one of the image unit or an evaluating unit co-operating with the image unit, on the image of the sub-region of the object at a location of the measuring point.

11. The method according to claim 10, wherein the focusing is effected as follows: in a process step F1, focusing onto at least the sub-region (A) of the measurement object, the image of the sub-region on the image unit again being reproduced by a display unit during the focusing, so that the focusing can be carried out by a user via visual monitoring, and by virtue of a coupling of the focusing of the image unit and of the measuring beam, focusing of the measuring beam onto the measuring point is effected, at least approximately simultaneously, and in a process step F2, fine adjustment of the focusing of the measuring beam onto the measuring point is carried out by at least one of optically or acoustically outputting a signal level of the measurement signal of the detector or by acoustically outputting vibrations of the object measured at the measuring point by the detector in an audible frequency range or sub-ranges thereof.

12. The method according to claim 11, wherein prior to process step F1, in a process step F0 alignment of the measuring beam by visual monitoring of the image of the sub-region is effected, first by effecting coarse adjustment by use of a telescope and then effecting fine adjustment by visual monitoring of the image of the sub-region.

* * * * *